(12) United States Patent
Sood et al.

(10) Patent No.: US 8,589,313 B2
(45) Date of Patent: *Nov. 19, 2013

(54) REAL-TIME LICENSE METERING OF A PROVISIONED APPLICATION IN A CLOUD COMPUTING ENVIRONMENT

(75) Inventors: Ajay Sood, Bangalore (IN); Vijay K. Sukthankar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/586,918

(22) Filed: Aug. 16, 2012

(65) Prior Publication Data

US 2012/0311160 A1 Dec. 6, 2012

Related U.S. Application Data

(63) Continuation of application No. 12/894,571, filed on Sep. 30, 2010.

(51) Int. Cl.
*G06F 17/00* (2006.01)
*G06F 21/00* (2013.01)

(52) U.S. Cl.
USPC .............................. 705/418; 705/400; 705/51

(58) Field of Classification Search
USPC .......... 705/1.1, 51–59, 7.11, 7.12, 7.29, 7.35, 705/30, 32, 34, 348, 400, 418, 500; 703/2
See application file for complete search history.

(56) References Cited

U.S. PATENT DOCUMENTS

| 8,249,906 B2 * | 8/2012 | Ponce de Leon ............ 705/7.18 |
| 2002/0022971 A1 | 2/2002 | Tanaka et al. |
| 2007/0043672 A1 | 2/2007 | Martin et al. |
| 2008/0215468 A1 | 9/2008 | Monsa-Chermon et al. |
| 2010/0015926 A1 * | 1/2010 | Luff ........................ 455/67.13 |

FOREIGN PATENT DOCUMENTS

WO 2006071007 A1 7/2006

OTHER PUBLICATIONS

Jiang, et al., "Software Licensing: Pay-Per-Use versus Perpetual," Carnegie Mellon University, 2007. pp. 1-35.

* cited by examiner

*Primary Examiner* — Igor Borissov
(74) *Attorney, Agent, or Firm* — Yeen Tham; Gregory K. Goshorn; Greg Goshorn, P.C.

(57) ABSTRACT

Provided are techniques for the costing of a license based on real-time usage of software on a hardware resource instead of upfront PVU based purchase of licenses. Service provider need not pay for the license charge till the end of life of that application and need not pay for an entire set of N licenses, considering that the service provider expects that the maximum number of application instances could be N.

13 Claims, 5 Drawing Sheets

REAL-TIME LICENSE METERING OF A PROVISIONED APPLICATION IN A CLOUD COMPUTING ENVIRONMENT

CROSS-REFERENCES TO RELATED APPLICATIONS

The present application is a continuation and claims the benefit of the filing date of an application entitled, "Real-Time License Metering of a Provisioned Application in a Cloud Computing Environment" Ser. No. 12/894,571, filed Sep. 30, 2010, assigned to the assignee of the present application, and herein incorporated by reference.

SUMMARY

Provided are techniques for the real-time license metering of a provisioned application in a cloud computing environment. One embodiment provided is a method comprising generating a servers parameter corresponding to a plurality of servers allocated to provisioning of a computing resource; generating an end-of-life parameter, N, corresponding to an expected duration of time for the provisioning of the computing resource; dividing the expected duration of time into a plurality of discreet intervals, $T_0$ through $T_N$; compiling a number of times an application has accessed the computing resource with respect to beginnings of a contiguous number of the plurality of discreet intervals; defining a random variable, $W_{T1}$ wherein $W_{T1}$ represents a number of servers of the plurality of servers provisioning the application at a particular time $T_1$ of the plurality of discreet intervals; calculating a probability that the application is provisioned on one computing resource at the particular time $T_1$; calculating a charge per unit parameter based upon the random variable and the probability; and generating a charge for provisioning of the computing resource based upon the charge per unit parameter and a count of a number of servers providing the computing resource at each of the plurality of discreet intervals.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
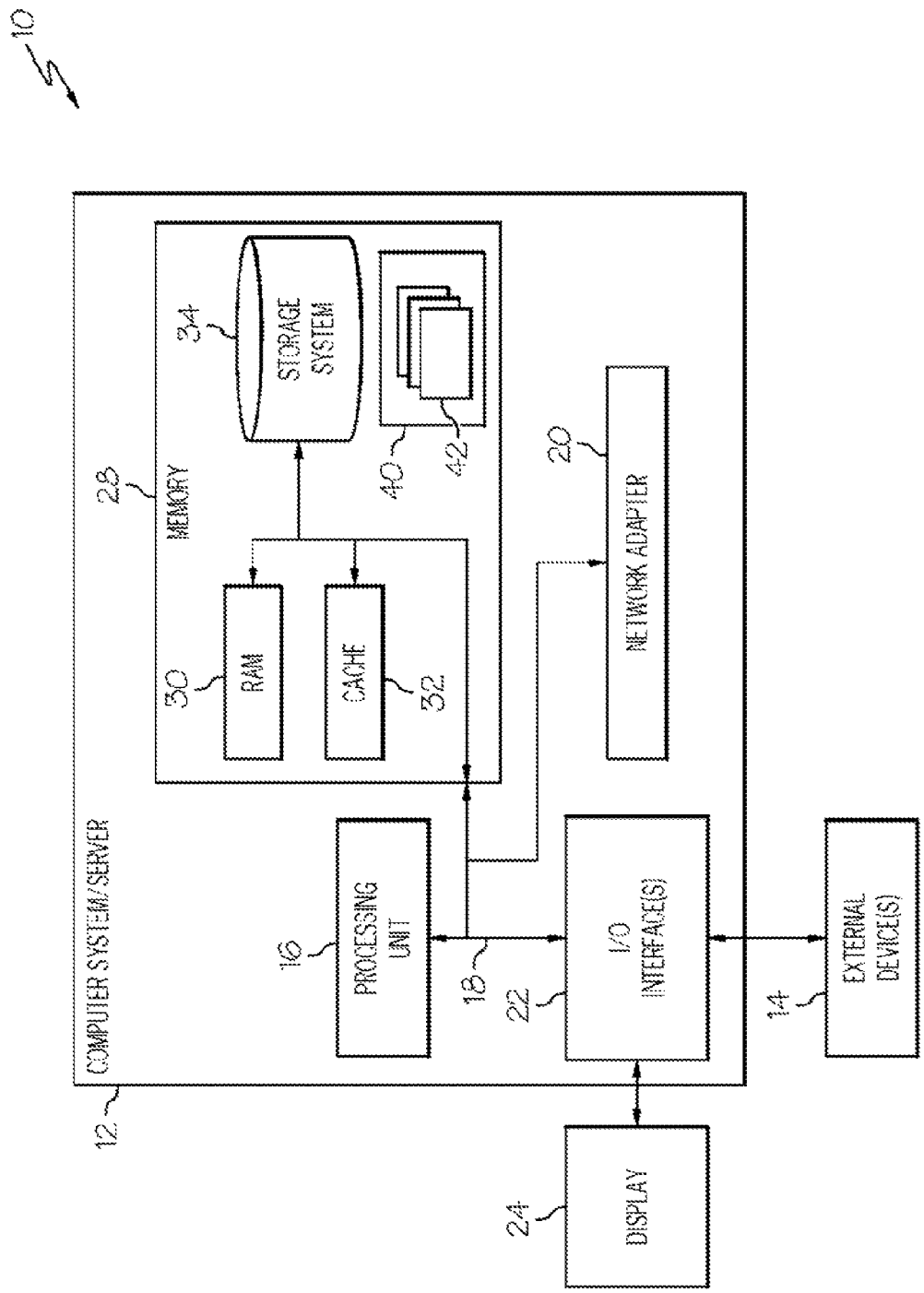
FIG. 1 depicts a cloud computing node according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for real-time licensing metering. The term "programmed method", as used herein, is defined to mean one or more process steps that are presently performed; or, alternatively, one or more process steps that are enabled to be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM) an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. For convenience, the Detailed Description includes the following definitions which have been derived from the "Draft NIST Working Definition of Cloud Computing" by Peter Mell and Tim Grance, dated Oct. 7, 2009.

As the IT industry comes to terms with pressures associated with saving infrastructure costs and looks for innovative technologies to address these issues, virtualization and Cloud Computing are considered as business models that may enable the industry to save costs and adapt to newer technologies, ensuring resources are used to maximum and only as required. Although these technologies have been introduced in the market, licensing methodologies have not changed. Customers still have to buy a license based on the processor value unit (PVU), which is based on hardware (HW) and software (SW) resources as installed and not on how much SW is actually used on specific HW. For example, if a cloud service provider expects a maximum of N software installations, the provider typically pays upfront for licenses based on PVU methodology when requesting N software installations. Currently, licenses are calculated on PVU basis with a fixed charge for the entire life of the application.

What the Inventors have herein realized is that there is currently no method that enables a user to calculate a license charge on a per unit of time basis. This type of method could help vendors charge for licenses on a per unit of time basis instead of charging for the whole life of an application on a PVU basis. This is different from pay per use where an end customer is charged on a pay per use basis. One embodiment of the disclosed techniques are for license enforcement on the service provider side to enable provisioning applications based on the load. Provided herein are techniques for the costing of a license based on real-time usage of actual SW resources on actual HW resources instead of upfront PVU based purchase of licenses.

Cloud computing is a model of service delivery for enabling convenient, on-demand network access to a shared pool of configurable computing resources (e.g. networks, network bandwidth, servers, processing, memory, storage, applications, virtual machines, and services). Cloud computing can be rapidly provisioned and released with minimal management effort or interaction with a provider of the service. This cloud model may include at least five characteristics, at least three service models, and at least four deployment models.

Some examples of characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Examples of Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Examples of Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 (see FIG. 2) is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12 and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
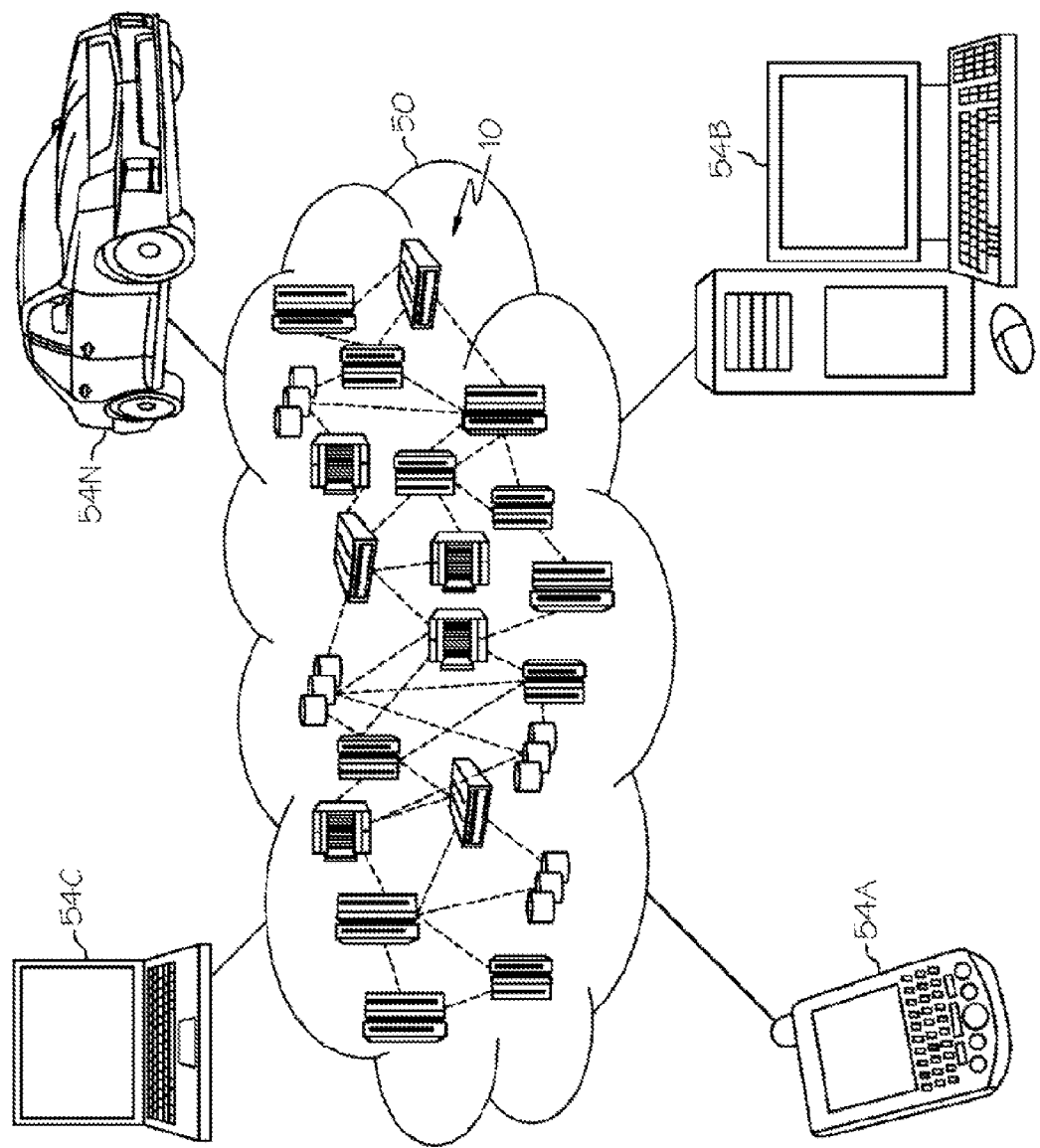
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
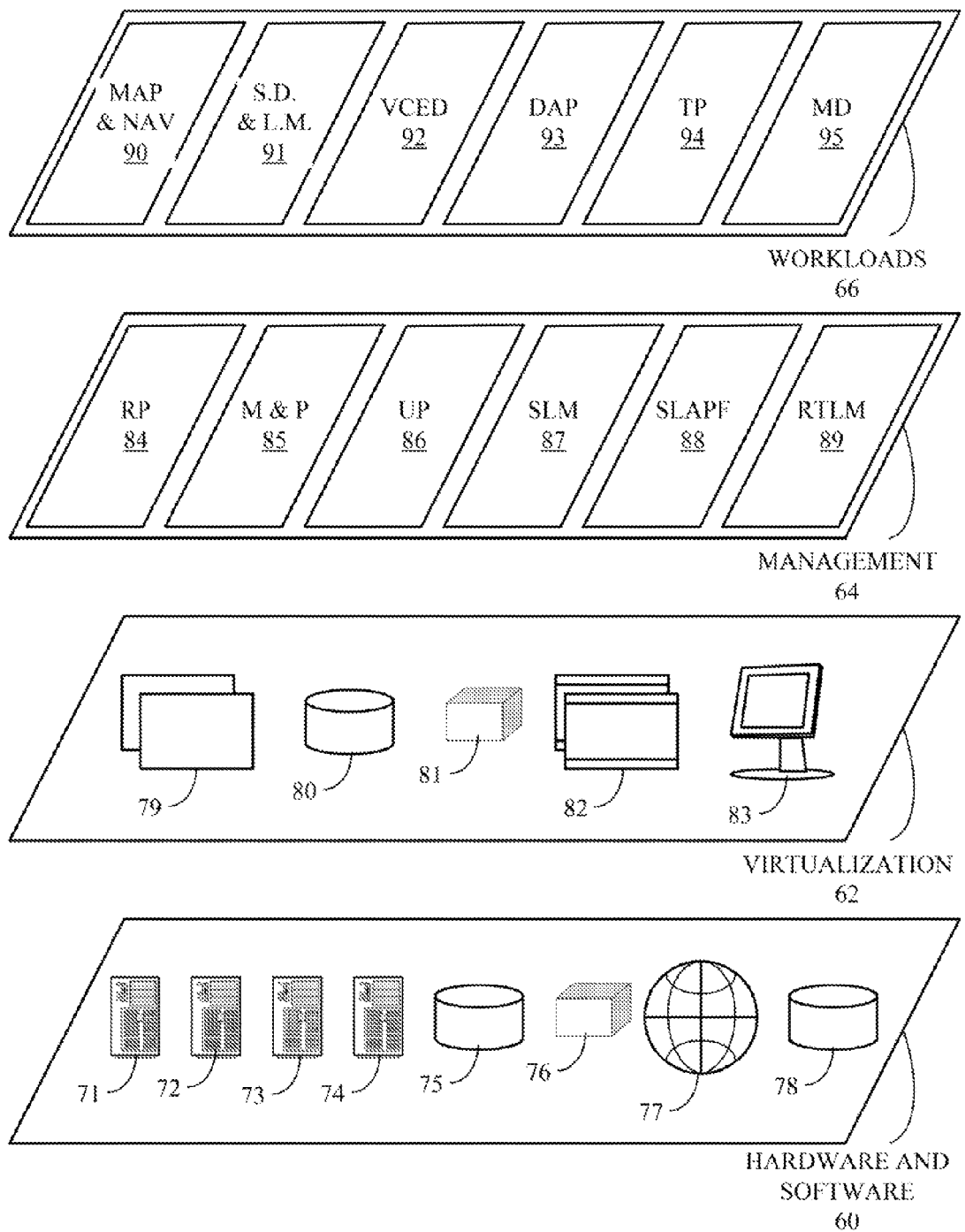
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided.

A hardware and software layer 60 includes hardware and software components. Examples of hardware components include mainframes 71, in one example IBM® zSeries® systems; RISC (Reduced Instruction Set Computer) architecture based servers 72, in one example IBM pSeries® systems; IBM xSeries® systems 73; IBM BladeCenter® systems 74; storage devices 75; networks and networking components 76. Examples of software components include network application server software, in one example IBM WebSphere® application server software 77: and database software, in one example IBM DB2® database software 78. (IBM, zSeries, pSeries, xSeries, BladeCenter, WebSphere, and DB2 are trademarks of international Business Machines Corporation registered in many jurisdictions Worldwide).

A virtualization layer 62 provides an abstraction layer from which the following examples of virtual entities may be provided; virtual servers 79; virtual storage 80; virtual networks 81, including virtual private networks; virtual applications 82 and operating systems; and virtual clients 83.

In one example, a management layer 64 may provide the functions described below. Resource provisioning (RP) 84 provides dynamic procurement of computing resources and other resources that are utilized to perform tasks within the cloud computing environment. Metering and Pricing (M&P) 85 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. A user portal (UP) 86 provides access to the cloud computing environment for consumers and system administrators. Service level management (SLM) 87 provides cloud computing resource allocation and management such that required service levels are met. Service level agreement planning and fulfillment (SLAPF) 88 provide prearrangement for, and procurement of, cloud computing resources for which a future requirement is anticipated in accordance with an SLA. A Real-time License Metering (RTLM) 89 provides flexible techniques for the costing of a license based on real-time usage of the SW on the HW resource instead of upfront PVU based purchase of licenses in accordance with the claimed subject matter. RTLM 89 is described in more detail below in conjunction with FIGS. 4-5.

A workloads layer 66 provides examples of functionality for which the cloud computing environment may be utilized. Examples of workloads and functions which may be provided from this layer include: mapping and navigation (MAP & NAV) 90; software development and lifecycle management (SD & LM) virtual classroom education delivery (VCED) 92; data analytics processing (DAP) 93; transaction processing (TP) 94; and mobile desktop (MD) 95. Components of layer 66 are provided as some examples of the type of workloads and functions in a cloud environment that may employ the claims subject matter as embodied in RTLM 89.

Figure 4:
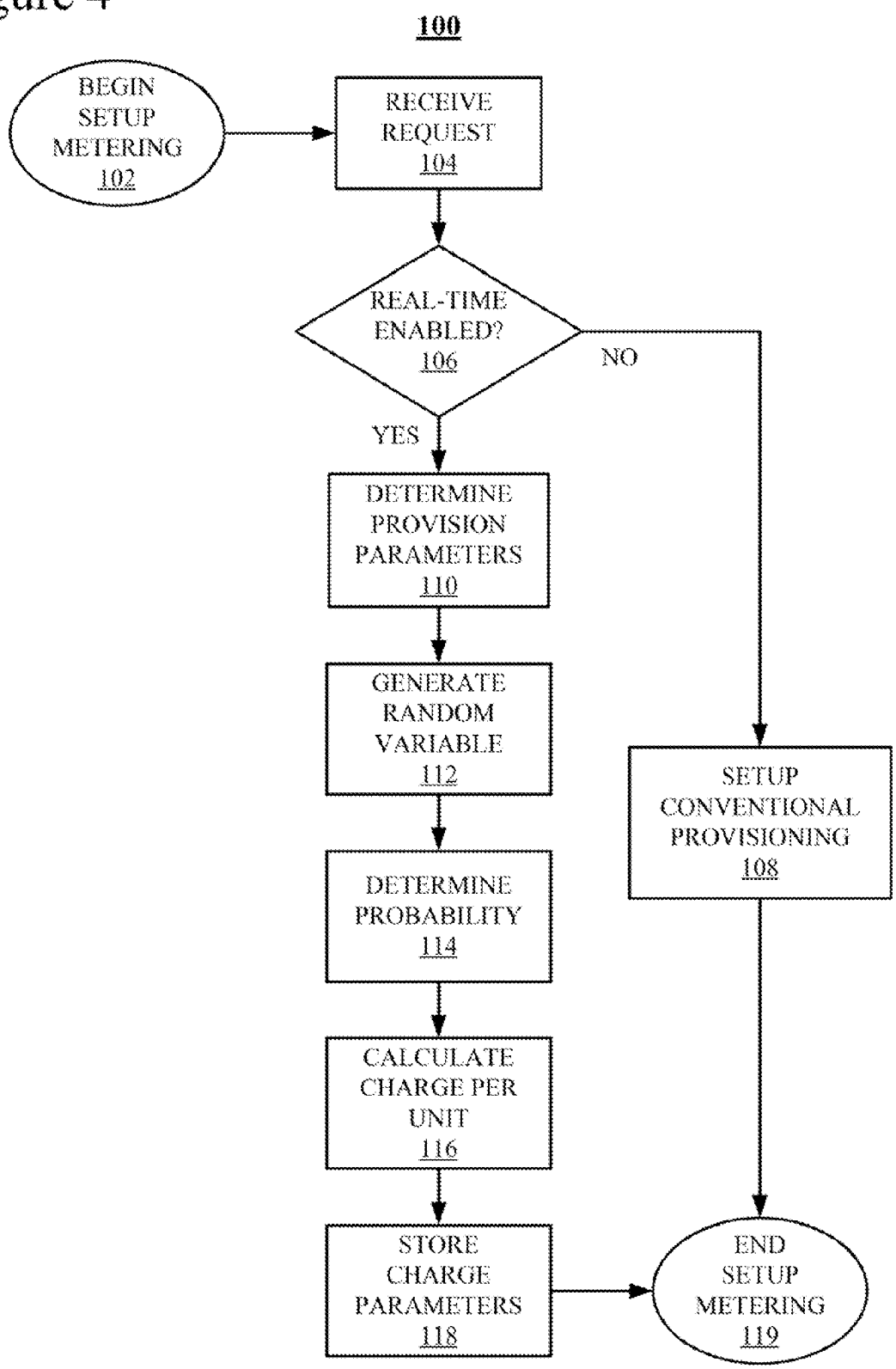
FIG. 4 is a flowchart of one example of a Setup Metering process that may implement aspects of the claimed subject matter.

FIG. 4 is a flowchart of one example of a Setup Metering process 100 that may implement aspects of the claimed subject matter. In this example, process 100 is stored on storage system 34 (FIG. 1) and executed on processing unit 16 (FIG. 1) of computing system 10 (FIG. 1) in conjunction with RTLM 89 (FIG. 3).

Process 100 starts in a "Begin Setup Metering" block 102 and proceeds immediately to a "Receive Request" block 104. During block 104, process 100 receives a request from a client to access an application or service (see 90-95. FIG. 3). During a "Real-Time Enabled?" block 106, process 100 determines whether or not both the client and the service are configured to enable real-time provision metering according to the disclosed technology. If not, control proceeds to a "Setup Conventional Provisioning" block 108 during which conventional charges for the requested service are applied. If, during block 106, process 100 determines that real-time provisioning is enabled, control proceeds to a "Determine Provision Parameters" block 110. During block 110, process 100 collects information necessary to setup RTP metering, including but not limited to, information on number of servers, particulars of different applications and a determination of the duration of time intervals to employ in implementing the disclosed techniques.

During a "Generate Random Variables" block 112, process 100 generates random variables for use in certain calculations. For example, assuming there are a total of N servers, a random variable $X_{T_1}$ (the random variable representing the number of servers provisioning the application at time T) is generated having a sample space of [0 . . . N]. Each such random variable is independent and identical. The variable is random because the number of servers that are to be provisioned is not known prior to a request and may change. The number of servers depends upon on workload and number of requests for a particular application. In other words, since the workload is random, the number of servers getting provisioned is also random.

During a "Determine Probability" block 114, process 100 determines a p such that p represents the probability of an application being provisioned on one server. Let $X_T$ be the random process representing the collection. Let the expected value for each random variable be represented by $E(X_{T1})$. Based on the assumptions stated above, each random variable $X_{T1}$ is a binomial random variable and the probability of k servers being provisioned for a given application can be calculated as a binomial random variable.

During a "Calculate Charge Per Unit [of Time]" block 116, process 100 generates a charge per unit of time for provisioning of the resource for which a request was received during block 104. For example, to calculate the per unit charge (charge per unit of time, the following, constraint may be applied: $E(X_{T1})$*(number of time intervals) *per_unit_charge<=N*(PVU based license value). For a binomial random variable, the expected value $E(X_{T1})=N*p$ helps calculate the license charge per unit of time.

In one embodiment in which changes happen on a continuous basis and are not assumed to happen only at the discreet time instances, the random process $X_T$ may be treated as a "continuous time Markov jump process" and the calculation of the expected value for the random process changes. The change in the expected value only affects the per unit charge and has no impact on the overall method of calculation of real time license charge.

During a "Store Charge Parameters" block 118, process 100 stores the parameters generated during blocks 110, 112, 114 and 116 in memory. Finally, during an "End Setup Metering" block 119, process 100 is complete. Once process 100 is complete, the parameters calculated and stored during process 100 may be employed by RTLM 89 to implement operation aspects of the claimed subject matter (see process 200, FIG. 5).

Figure 5:
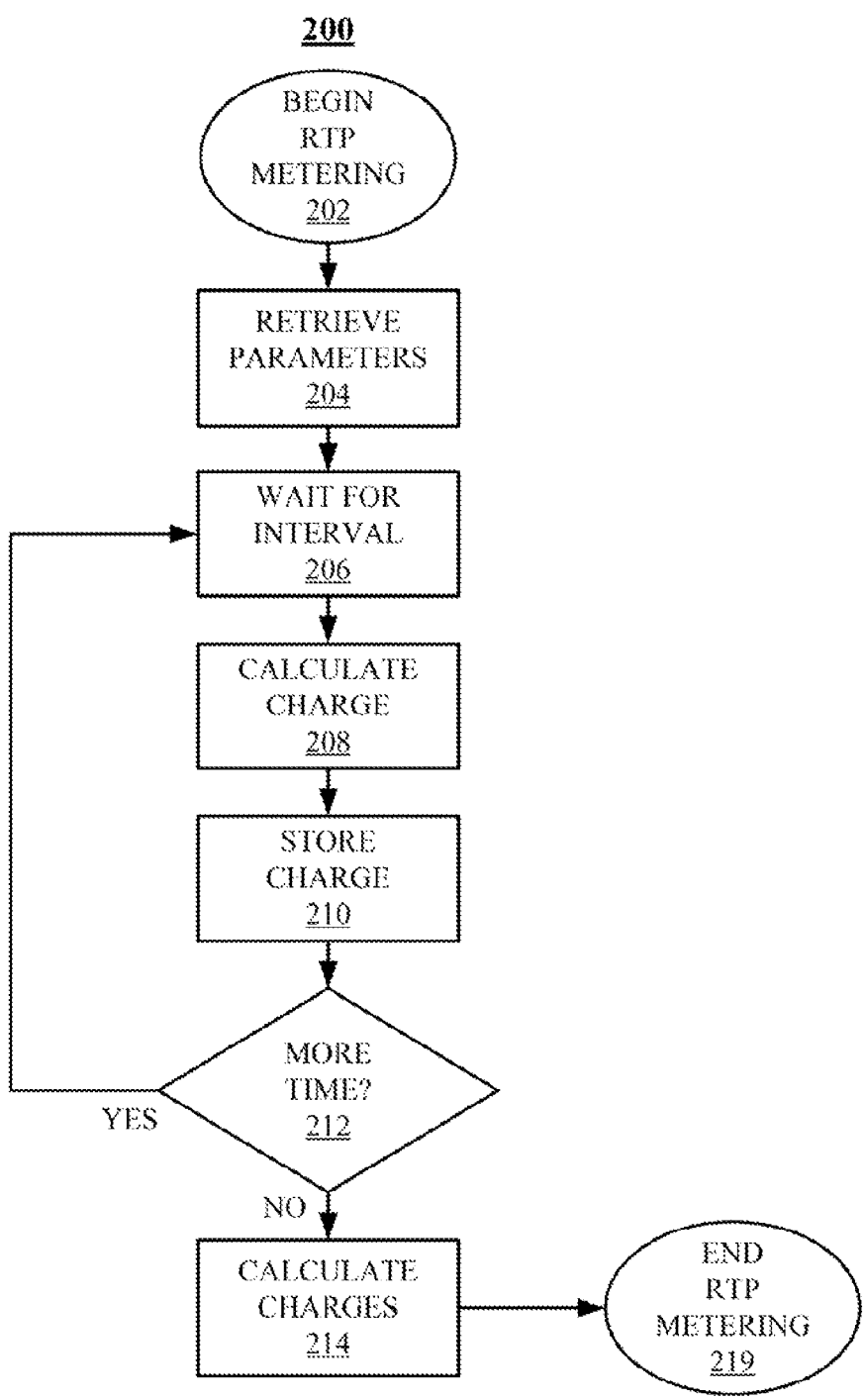
FIG. 5 is a flowchart of one example of a Real-Time Provision (RTP) Metering process that may implement aspects of the claimed subject matter.

FIG. 5 is a flowchart of one example of a Real-Time Provision (RTP) Metering process 200 that may implement aspects of the claimed subject matter. Like process 100 (FIG. 4), in this example, process 200 is stored on storage system 34 (FIG. 1) and executed on processing unit 16 (FIG. 1) of computing system 10 (FIG. 1) in conjunction with RTLM 89 (FIG. 3).

Process 200 starts in a "Begin Real-Time Provision (RTP) Metering" block 202 and proceeds immediately to a "Retrieve Parameters" block 204. During block 204, previously stored parameters (see 118, FIG. 4) relevant to the calculations are retrieved from data storage. During a "Wait for Interval" block 206, process 200 waits for the beginning of a discrete time interval. As explained above in conjunction with FIG. 4, in this example, a determination of application or service usage is performed only at discreet time instances. In another embodiment, changes happen on a continuous basis, the random process $X_T$ is treated as a "continuous time Markov jump process" and the calculation of the expected value for the random process changes. The change in the expected value only affects the per unit charge and has no impact on the overall method of calculation of real time license charge. In other words, states of the servers serving application provisioning requests changes only at the units of time which are a unit apart and state changes are considered only at regular intervals that are a time unit apart. For example, states of servers changes only at t1, t2, t3 etc. where (t2−t1)=(t3−t2)=one unit. Any changes between the discreet times t2, t3, etc. are considered to happen only at the discreet time ticks. The starting time for the application life is considered as t0. An application being up at time $t_1$ is considered to be independent of whether it was up at $t_1-1$ and an application found being used at a time $t_1$ is considered to be used for the next unit of time. In addition all servers and applications are considered independently.

During a "Calculate Charge" block 208, process 200 calculates the charge per unit of time per instance, or "C" by employing the following:

Let the cumulative number of units used be Y. At every regular interval,
1. Check the number of applications provisioned at the particular time (say, k)
2. Add to the counter of number of units used Y=Y+k (total units consumed thus far)
3. At license value calculation points–convey the counter value of calculation module. License charge=Y*C During a "Store Charge" block 210, the charge "C" calculated during block 208 is stored in memory for future professing. A license charge may be recorded by the application vendor in some module and the service provider can be charged accordingly.

During a "More Time?" block 212, process 200 determines whether or not the application or service provisioning has concluded. Total lifetime of an application is capped by the suggested End of Life for the application (to make it a bounded random variable). If process 200 determines that real-time metering of the application or service should continue, control returns to "Wait for Interval" block 206 and processing continues as described above. If, during block 212, process 200 determines that real-time metering of the application or service should terminate, control proceeds to a "Calculate Charges" block 214 during which all the charges accumulated through the iterations of blocks 206, 208, 210 and 212 are totaled. Finally, in an "End RTP Metering" block 219, process 200 is complete.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

We claim:

1. A method, comprising:
generating a servers parameter corresponding to a plurality of servers allocated to provisioning of a computing resource;
generating an end-of-life parameter, N, corresponding to an expected duration of time for the provisioning of the computing resource;
dividing the expected duration of time into a plurality of discreet intervals, $T_0$ through $T_N$;
compiling a number of times an application has accessed the computing, resource with respect to beginnings of a contiguous number of the plurality of discreet intervals;
defining a random variable, $W_{T1}$, wherein $W_{T1}$ represents a number of servers of the plurality of servers provisioning the application at a particular time $T_1$ of the plurality of discreet intervals;
calculating, by a processor, a probability that the application is provisioned on one computing resource at the particular time $T_1$;
calculating, by a processor, a charge per unit parameter based upon the random variable and the probability; and
generating, by a processor, a charge for provisioning of the computing resource based upon the charge per unit parameter and a count of a number of servers providing the computing resource at each of the plurality of discreet intervals.

2. The method of claim 1, wherein the plurality of servers allocated to the provisioning of the computing resource is configured in a cloud configuration.

3. The method of claim 1, wherein the defining the random variable is based upon an expected workload and expected number of applications requesting the computing resource.

4. The method of claim 1, wherein the random variable, represented as $E(X_{T1})$, is a binomial random variable representing a number of servers allocated to the provisioning of the computing resource.

5. The method of claim 4, wherein the charge per unit parameter is constrained by the formula $E(X_{T1})*$(charge per unit of time)*(number of time intervals (N))$<=$N*(a PVU based license value).

6. The method of claim 1, wherein rather than dividing the expected duration of time into a plurality of discreet intervals, $T_0$ through $T_N$, provisioning changes are assumed to occur on a continuous basis and compiling a number of times an application has accessed the computing resource is based upon a continuous time Markov jump process.

7. The method of claim 1, wherein the expected duration of time for the provisioning of the computing resource is open ended.

8. A method, comprising:
receiving a request for a provisioning of a computing service provided by a plurality of servers;
generating a servers parameter corresponding to the plurality of servers allocated to the provisioning of the computing resource;
generating an end-of-life parameter, N, corresponding to an expected duration of time for the provisioning of the computing resource;
dividing the expected duration of time into a plurality of discreet intervals, $T_0$ through $T_N$;
compiling a number of times an application has accessed the computing resource with respect to beginnings of a contiguous number of the plurality of discreet intervals;
defining a random variable, $W_{T1}$, wherein $W_{T1}$ represents a number of servers of the plurality of servers provisioning the application at a particular time $T_1$ of the plurality of discreet intervals;
calculating, by a processor, a probability that the application is provisioned on one computing resource at the particular time $T_1$;
calculating, by a processor, a charge per unit parameter based upon the random variable and the probability; and
generating, by a processor, a charge for provisioning of the computing resource based upon the charge per unit parameter and a count of a number of servers providing the computing resource at each of the plurality of discreet intervals.

9. The method of claim 8, wherein the plurality of servers allocated to the provisioning of the computing resource is configured in a cloud configuration.

10. The method of claim 8, wherein the defining die random variable is based upon an expected workload and expected number of applications requesting the computing resource.

11. The method of claim 8, wherein the random variable, represented as $E(X_{T1})$, is a binomial random variable representing a number of servers allocated to the provisioning of the computing resource.

12. The method of claim 11, wherein the charge per unit parameter is constrained by the formula $E(X_{T1})*$(charge per unit of time)*(number of time intervals (N))$<=$N*(PVU based license value).

13. The method of claim 8, wherein rather than dividing the expected duration of time into a plurality of discreet intervals, $T_0$ through $T_N$, provisioning changes are assumed to occur on a continuous basis and compiling a number of times an application has accessed the computing resource is based upon a continuous time Markov jump process.

* * * * *